US012647487B2

(12) United States Patent
Barbu et al.

(10) Patent No.: US 12,647,487 B2
(45) Date of Patent: Jun. 2, 2026

(54) ENHANCEMENT ON DEVICE DETECTION SESSION

(71) Applicant: Nokia Technologies Oy, Espoo (FI)

(72) Inventors: Oana-Elena Barbu, Aalborg (DK);
Benny Vejlgaard, Aalborg (DK);
Johannes Harrebek, Aalborg (DK);
Nitin Mangalvedhe, Naperville, IL
(US)

(73) Assignee: NOKIA TECHNOLOGIES OY,
Espoo (FI)

( * ) Notice: Subject to any disclaimer, the term of this
patent is extended or adjusted under 35
U.S.C. 154(b) by 204 days.

(21) Appl. No.: 18/486,630

(22) Filed: Oct. 13, 2023

(65) Prior Publication Data

US 2024/0171642 A1 May 23, 2024

Related U.S. Application Data

(60) Provisional application No. 63/384,786, filed on Nov.
23, 2022.

(51) Int. Cl.
*G06F 15/16* (2006.01)
*H04L 67/142* (2022.01)
*H04L 67/146* (2022.01)

(52) U.S. Cl.
CPC .......... *H04L 67/146* (2013.01); *H04L 67/142*
(2013.01)

(58) Field of Classification Search
CPC .. G06K 7/10; G06K 7/10128; G06K 7/10386;
G06K 19/0723; H04W 4/80; Y02D 30/70
USPC ....................................................... 709/228
See application file for complete search history.

(56) References Cited

U.S. PATENT DOCUMENTS

| | | | | |
|---|---|---|---|---|
| 2015/0131478 A1* | 5/2015 | Bouvet | ............... | H04L 65/1104 |
| | | | | 370/254 |
| 2015/0220762 A1* | 8/2015 | Jiang | .................. | G06K 7/10128 |
| | | | | 235/375 |
| 2015/0365486 A1* | 12/2015 | Kotecha | .................. | H04W 4/80 |
| | | | | 455/414.1 |
| 2016/0112982 A1* | 4/2016 | Babineau | .............. | H04W 64/00 |
| | | | | 455/456.1 |
| 2016/0323925 A1* | 11/2016 | Alanen | .................. | H04W 8/005 |
| 2017/0265021 A1* | 9/2017 | Desdier | .................. | H04W 4/80 |

(Continued)

FOREIGN PATENT DOCUMENTS

| | | |
|---|---|---|
| CN | 105723684 A | 3/2019 |
| TW | I530120 B | 4/2016 |
| WO | 2019/158187 A1 | 8/2019 |

OTHER PUBLICATIONS

"3rd Generation Partnership Project; Technical Specification Group
Radio Access Network; NR; Physical channels and modulation
(Release 17)", 3GPP TS 38.211, V17.2.0, Jun. 2022, pp. 1-136.

(Continued)

*Primary Examiner* — Imad Hussain
(74) *Attorney, Agent, or Firm* — McCarter & English,
LLP

(57) ABSTRACT

Example embodiments of the present disclosure relate to
device detection session. An apparatus acting as a reader of
a device detection session monitors a response signal from
a device during the device detection session. The device is
operable to be activated by an activation signal transmitted
from a first device of the device detection session. The
apparatus then causes a change in the device detection
session based on the monitoring.

20 Claims, 4 Drawing Sheets

(56) References Cited

U.S. PATENT DOCUMENTS

| | | |
|---|---|---|
| 2020/0097690 A1 | 3/2020 | Wan et al. |
| 2021/0271833 A1 | 9/2021 | Sheng et al. |
| 2021/0326542 A1 | 10/2021 | Hong et al. |
| 2022/0182453 A1* | 6/2022 | Jung ................... H04L 67/1048 |

OTHER PUBLICATIONS

"3rd Generation Partnership Project; Technical Specification Group Radio Access Network; NR; Physical layer procedures for control (Release 17)", 3GPP TS 38.213, V17.2.0, Jun. 2022, pp. 1-256.

"Moderator's summary of Discussion [RAN94e-R18Prep-28] Passive IoT", 3GPP TSG RAN#94e, RP-212688, Agenda: 8A.5, Ericsson, Dec. 6-17, 2021, pp. 1-45.

Lin et al., "Battery-Less IoT Sensor Node with PLL-Less WiFi Backscattering Communications in a 2.5-µW Peak Power Envelope", Symposium on VLSI Circuits, Jun. 13-19, 2021, pp. 1-2.

Chen et al., "Reliable and Practical Bluetooth Backscatter With Commodity Devices", IEEE/ACM Transactions on Networking, vol. 29, No. 4, Aug. 2021, pp. 1717-1729.

Lyu et al., "A UHF/UWB Hybrid RFID Tag With a 51-m Energy-Harvesting Sensitivity for Remote Vital-Sign Monitoring", IEEE Transactions on Microwave Theory and Techniques, vol. 68, No. 11, Nov. 2020, pp. 4886-4895.

Tang et al., "Self-Sustainable Long-Range Backscattering Communication Using RF Energy Harvesting", IEEE Internet of Things Journal, vol. 8, No. 17, Sep. 1, 2021, pp. 13737-13749.

"Msc-generator", Sourceforge, Retrieved on Oct. 12, 2023, Webpage available at : https://sourceforge.net/projects/msc-generator/.

"3rd Generation Partnership Project; Technical Specification Group Radio Access Network; NR; Physical layer procedures for data (Release 17)", 3GPP TS 38.214, V17.2.0, Jun. 2022, pp. 1-228.

"3rd Generation Partnership Project; Technical Specification Group Radio Access Network; LTE Positioning Protocol (LPP) (Release 17)", 3GPP TS 37.355, V17.0.0, Mar. 2022, pp. 1-340.

Munilla et al., "5G-Compliant Authentication Protocol for RFID", Electronics, vol. 9, No. 11, Nov. 19, 2020, pp. 1-15.

"IEEE 802.11", Wikipedia, Retrieved on Oct. 3, 2023, Webpage available at : https://en.wikipedia.org/wiki/IEEE_802.11.

"Ambient IoT study on use cases and requirements", 3GPP TSG-RAN #98-e, RP-222733, Agenda: 9.2.3, Nokia, Dec. 12-16, 2022, 5 pages.

Extended European Search Report received for corresponding European Patent Application No. 23209958.0, dated Feb. 7, 2024, 7 pages.

* cited by examiner

100

110

120-N 120-1

130-2

120-2

130-1

130-M

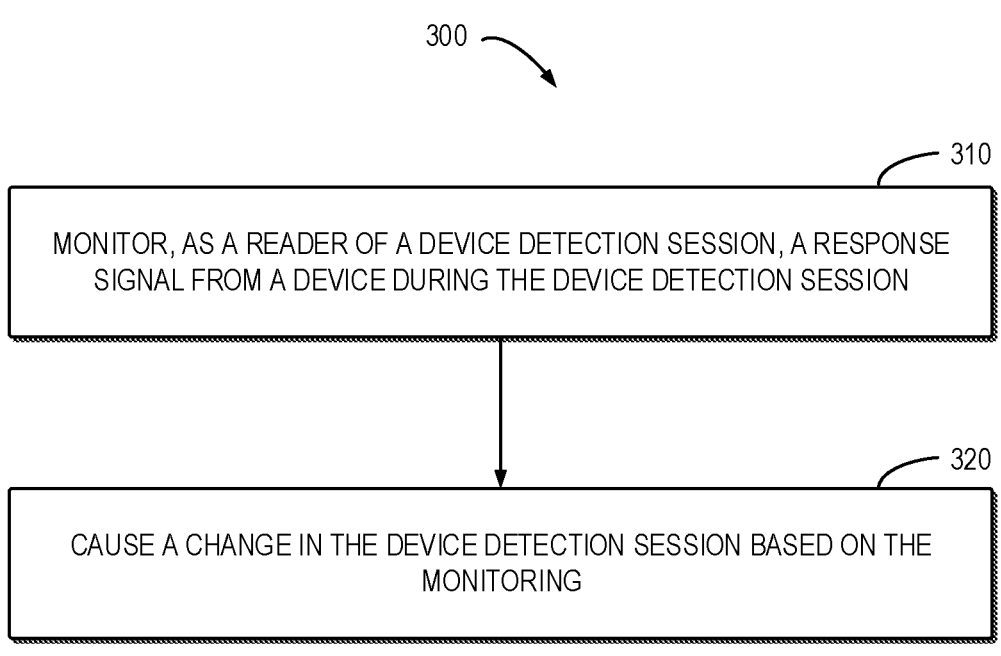

300

310

MONITOR, AS A READER OF A DEVICE DETECTION SESSION, A RESPONSE SIGNAL FROM A DEVICE DURING THE DEVICE DETECTION SESSION

320

CAUSE A CHANGE IN THE DEVICE DETECTION SESSION BASED ON THE MONITORING

FIG. 3

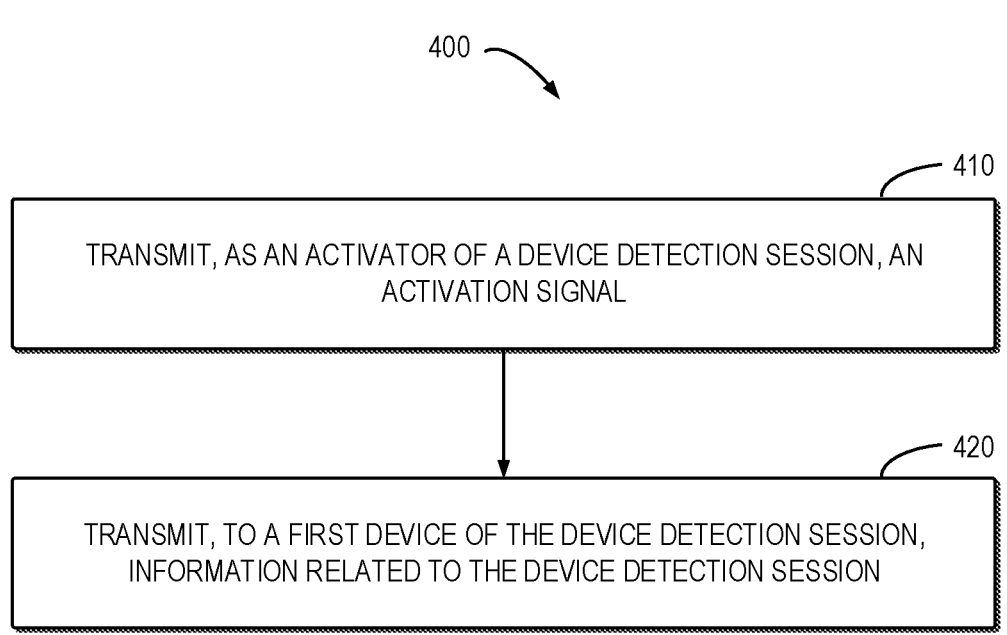

400

410

TRANSMIT, AS AN ACTIVATOR OF A DEVICE DETECTION SESSION, AN ACTIVATION SIGNAL

420

TRANSMIT, TO A FIRST DEVICE OF THE DEVICE DETECTION SESSION, INFORMATION RELATED TO THE DEVICE DETECTION SESSION

FIG. 4

ENHANCEMENT ON DEVICE DETECTION SESSION

RELATED APPLICATION

This application claims priority to, and the benefit of, U.S. Provisional Application 63/384,786, filed on Nov. 23, 2022, the contents of which is incorporated herein by reference in its entirety.

FIELD

Various example embodiments of the present disclosure generally relate to the field of telecommunication and in particular, to methods, devices, apparatuses and computer readable storage medium for device detection session.

BACKGROUND

3GPP has specified Narrow band Internet of Things (NB-IoT), enhanced Machine-Type Communication (eMTC) and New Radio Reduced capability (NR RedCap) to satisfy the requirements on low cost and low power devices for wide area IoT communication. These IoT devices usually consume tens or hundreds of milliwatts power during receiving and/or transmitting, while the cost is a few dollars.

However, to achieve the internet of everything (IoE), IoT devices with ten or even a hundred times lower cost and power consumption are needed, especially for a large number of applications requiring battery less devices. There is a common interest in the IoT technology supporting battery less devices.

SUMMARY

In general, example embodiments of the present disclosure provide a solution of positioning accuracy enhancements.

In a first aspect of the present disclosure, there is provided an apparatus. The apparatus comprises at least one processor; and at least one memory storing instructions that, when executed by the at least one processor, cause the apparatus at least to perform: monitoring, at the apparatus and as a reader of a device detection session, a response signal from a device during the device detection session, wherein the device is operable to be activated by an activation signal transmitted from a first device of the device detection session; and causing a change in the device detection session based on the monitoring.

In a second aspect of the present disclosure, there is provided an apparatus. The apparatus comprises at least one processor; and at least one memory storing instructions that, when executed by the at least one processor, cause the apparatus at least to perform: transmitting, at the apparatus and as an activator of a device detection session, an activation signal, wherein a device is operable to be activated by the activation signal; and transmitting, to a first device of the device detection session, information related to the device detection session, wherein a change in the device detection session is to be caused by the first device based on the information.

In a third aspect of the present disclosure, there is provided a method. The method comprises: monitoring, at an apparatus and as a reader of a device detection session, a response signal from a device during the device detection session, wherein the device is operable to be activated by an activation signal transmitted from a first device of the device detection session; and causing a change in the device detection session based on the monitoring.

In a fourth aspect of the present disclosure, there is provided a method. The method comprises: transmitting, at an apparatus and as an activator of a device detection session, an activation signal, wherein a device is operable to be activated by the activation signal; and transmitting, to a first device of the device detection session, information related to the device detection session, wherein a change in the device detection session is to be caused by the first device based on the information.

In a fifth aspect of the present disclosure, there is provided an apparatus. The apparatus comprises: means for monitoring, at the apparatus and as a reader of a device detection session, a response signal from a device during the device detection session, wherein the device is operable to be activated by an activation signal transmitted from a first device of the device detection session; and means for causing a change in the device detection session based on the monitoring.

In a sixth aspect of the present disclosure, there is provided an apparatus. The apparatus comprises: means for transmitting, at the apparatus and as an activator of a device detection session, an activation signal, wherein a device is operable to be activated by the activation signal; and means for transmitting, to a first device of the device detection session, information related to the device detection session, wherein a change in the device detection session is to be caused by the first device based on the information.

In a seventh aspect of the present disclosure, there is provided a non-transitory computer readable medium. The non-transitory computer readable medium comprises program instructions that when executed by an apparatus, cause the apparatus to perform at least the following: monitoring, at the apparatus and as a reader of a device detection session, a response signal from a device during the device detection session, wherein the device is operable to be activated by an activation signal transmitted from a first device of the device detection session; and causing a change in the device detection session based on the monitoring.

In an eighth aspect of the present disclosure, there is provided a non-transitory computer readable medium. The non-transitory computer readable medium comprises program instructions that when executed by an apparatus, cause the apparatus to perform at least the following: transmitting, at the apparatus and as an activator of a device detection session, an activation signal, wherein a device is operable to be activated by the activation signal; and transmitting, to a first device of the device detection session, information related to the device detection session, wherein a change in the device detection session is to be caused by the first device based on the information.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 3 illustrates a flowchart of a method implemented at a device according to some example embodiments of the present disclosure;

FIG. 4 illustrates a flowchart of a method implemented at a device according to some example embodiments of the present disclosure;

Throughout the drawings, the same or similar reference numerals represent the same or similar element.

DETAILED DESCRIPTION

Figure 1:
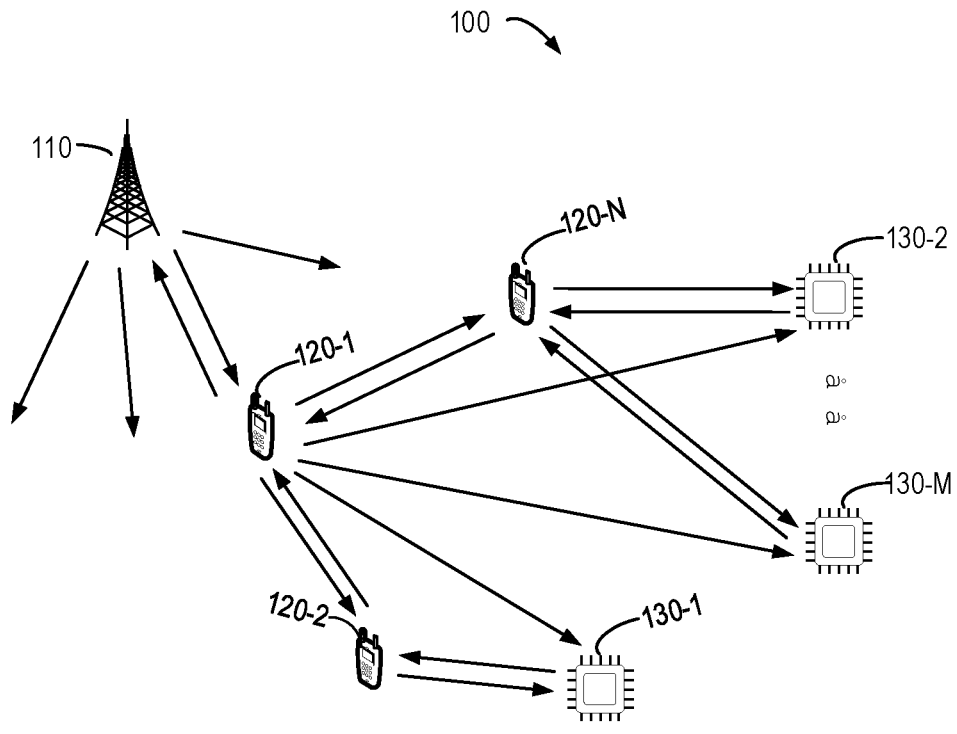
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, "at least one of the following: <a list of two or more elements> and "at least one of <a list of two or more elements> and similar wording, where the list of two or more elements are joined by "and" or "or", means at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a Next Generation NodeB (NR NB), a Remote Radio Unit (RRU), a radio header (RH), a remote radio head (RRH), Integrated Access and Backhaul (JAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

As used herein, the term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (JAB) node (a.k.a. a relay node). In the following description, the terms "terminal device", "communication device", "terminal", "user equipment" and "UE" may be used interchangeably.

As used herein, the term "tag", "passive tag" or "passive device" refers to battery less devices with no energy storage capability at all, and completely dependent on the availability of an external source of energy, or alternatively, devices with limited energy storage capability that do not need to be replaced or recharged manually. For example, such device may be supported by radio frequency identification (RFID), Wi-Fi, Bluetooth, UWB, and LoRa and so on. The power consumption of commercial passive RFID tags can be as low as 1 microwatt. The key techniques enabling such low power consumption are envelope detection for downlink data reception, and backscatter communication for uplink data transmission. RFID is designed for short-range communications, whose typical effective range is less than 10 meters. As the air interface of RFID almost remains unchanged since 2005, the simple transmission scheme becomes the obstacle of improving its link budget and capability of supporting scalable network. Attracted by the extremely low power consumption of backscatter communication, many non-3GPP technologies begin to put efforts into related research, such as Wi-Fi, Bluetooth, UWB, and LoRa. Various research shows that a few or tens of microwatts power consumption can be supported for passive tags based on or with small modifications to the above air interfaces. A significant proportion of the studies are targeting at long range communication. Among them, a LoRa tag implemented with commercial off-the-shelf components can send its sensing data to the receiver of 381 meters away. Currently, most of the studies are focusing on independent detailed techniques for various optimization targets.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

The number of IoT connections has been growing rapidly and is predicted to be hundreds of billions in the coming years. With more and more 'things' expected to be interconnected for improving production efficiency and increasing comforts of life, it demands further reduction of size, cost, and power consumption for IoT devices. In particular, regular replacement of battery for all the IoT devices is impractical due to the tremendous consumption of materials and manpower. It has become a trend to use energy harvested from environments to power IoT devices for self-sustainable communications, especially in applications with a huge number of devices (e.g., ID tags and sensors).

In view of this, there is a common interest of deploying passive devices or battery less devices in 5G NR. To support and integrate passive IoT in 5G NR network infrastructure, one initial task for the network is to identify the coarse location of the passive IoT devices (e.g., tags) as there are no active elements on these devices and thus no means for the tags to make themselves visible or heard.

Discovering a passive IoT device is a challenging task due to the inherent nature of the passive radio. More precisely, the passive radio does not have a power source, and can hear other radios only in its own proximity, for example, most often with a 5-10 m radius. Furthermore, its mobility and operation are transparent to the NR network. Because of the above limitations, the NR network cannot apply the typically NR UE paging operations, thus alternatives need to be defined. This requires an activator in close proximity (5-10 m) to the passive tag. In particular, the NR network can discover the tag only if the tag hears an activation signal loud enough so that it can be charged sufficiently and generate an "I am here" response which is loud enough to be heard by another nearby network element (e.g., a gNB, radio side unit (RSU), UE, etc.).

However, such a discovery process of passive IoT device consumes unpredictable energy and time. Moreover, due to possible blockage between the network elements and the tags, the tags may not be able to hear the activation signal even if the activator is in close proximity, thus causing the discovery process to fail.

According to some example embodiments of the present disclosure, there is provided a device detection solution. In this solution, an apparatus acting as a reader of a device detection session monitors a response signal from a device during the device detection session. The device is operable to be activated by an activation signal transmitted from a first device of the device detection session. The apparatus then causes a change in the device detection session based on the monitoring. In this way, the discovery process of passive devices can be efficiently implemented, which improves the device detection session at least in terms of time, cost and energy consumption.

Example embodiments of the present disclosure will be described in detail below with reference to the accompanying drawings.

Example Environment

FIG. 1 illustrates an example communication environment 100 in which example embodiments of the present disclosure can be implemented. The communication environment 100 may be a communication system deployed in outdoor or indoor. As shown in FIG. 1, the communication environment 100 includes a gNB 110, UEs 120-1 to 120-N (which may be collectively referred to as UE 120 hereinafter), and tags 130-1 to 130-M.

The gNB 110 and UE 120 are network elements in the communication environment 100, and may communicate with each other. The gNB 110 and UE 120 may be operable to act as an activator or act as a reader of a device detection session. The tags 130-1 to 130-M, which may be collectively referred to as tag 130 or passive device 130 hereinafter, are deployed in the communication network 100, and may have no or limited energy storage capability. The gNB 110 and the UE 120 may discover the tag 130 via the device detection session.

In the context of the present disclosure, the tag 130 or any one of 130-1 to 130-M comprises a tag, a sensor device, a passive radio device, or a device with limited or zero energy storage capability; it is also denoted as a device in the disclosure, and a device detection session in the disclosure comprises a discovery or detection process for a tag, a sensor device, a passive radio device, or a device with limited or zero energy storage capability. In the following description 'tag' and/or 'tag discovery process' are used as an example and the disclosure is not limited to 'tag' and/or 'tag discovery process'. In the tag discovery process, at least one of the gNB 110 and the UE 120 may act as an activator and transmit an activation signal. If the activator is in proximity to the tag 130, and there is no blockage between the activator and the tag 130, the tag 130 can hear the activation signal. The tag 130 may then be activated or energized and generate a response signal. The response signal can be received by at least another one of the gNB 110 and the UE 120 that is in proximity to the tag 130. In this case, the at least another one device acts as a reader. The reader may measure the response signal, such as, a received power, time of arrival (ToA), etc., and then report the tag measurements to the activator. The activator may position the tag 130 based on the tag measurements. In the example embodiments of the present disclosure, the term 'device measurements' is also used to denote measurements on response signal from a tag, a sensor device, a passive radio device, or a device with limited or zero energy storage capability.

In some example embodiments, the activator-reader pairs may be established as a result of a pairing process that is required for tag discovery. For example, the activator-reader pairs may consider all the candidate activators and readers, i.e., a reader paired with every candidate activator and an activator paired with every candidate reader.

Additionally, or alternatively, the role of an activator and a reader can be changed and/or exchanged between the network elements in the communication network 100. For example, during an ongoing tag discovery process, the gNB 110 acting as the activator may handover the activator role to the other device, such as, the UE 120-1. To this end, an inheritance scheme is defined for the gNB 110 and the UE 120-1, which may be either specified in advance or configured in a flexible manner.

The inheritance scheme may cover the following scenarios:

1) A reader may inherit an activator role from the current activator, which may be followed a selection of at least one device acting as a new reader, 2) A network element may inherit an activator role from the current activator,
3) A network element may inherit a reader role from the current reader,
4) a combination of scenarios 2) and 3)).

In some example embodiments, a tag discovery timer may be utilized for the inheritance scheme, where a maximum value of the tag discovery timer is denoted by D. In particular, the activator may start and update the tag discovery timer (e.g., a value of the tag discovery timer may be denoted by dt) during the tag discovery process. If the tag discovery timer is not expired, e.g., dt<D, the gNB 110 and UE 120 may attempt to detect the tag 130, or even change their roles for the tag discovery. If the tag discovery timer is expired, e.g., dt≥D, then the tag discovery process is terminated. Furthermore, if no tag is detected until the tag discovery timer is expired, the tag discovery is failed.

Additionally, or alternatively, in some example embodiments, a counter for counting a number of at least one change related to an activator or a reader may be utilized for the inheritance scheme, where the value of the counter is denoted by h and a maximum value of the counter is denoted by Z. For example, the device may initiate the counter, e.g., h=0, and the value of the counter is incremented by 1 for each inheritance of the activator or the reader.

In some example embodiments, the device acting as the activator may provide configurations of the device detection session to the device acting as the reader. The configurations of the device detection session may include, but not limited to, a maximum value of the tag discovery timer, a maximum value of the counter, a configuration of the activation signal, a configuration of tag measurement reporting/relaying, etc.

By way of example, as shown in FIG. 1, the gNB 110 may initiate the tag discovery process, and start the tag discovery timer. The gNB 110 has been paired with the UE 120-1, and the gNB 110 may act as the activator while the UE 120-1 as the reader. The gNB 110 may transmit the activation signal. Furthermore, the gNB 110 may transmit information related to the device detection session to the UE 120-1, which includes but not limited to, a value of the tag discovery timer dt and/or a value of the counter h. Accordingly, the UE 120-1 may attempt to detect the tag 130 by hearing the response signal.

If the UE 120-1 fails to detect the tag 130, the UE 120-1 may inherit the activator role. In other words, for each failed detection of tag, the reader may become the activator and generate an activation signal that may be specific to one or more tag. In some example embodiments, the UE 120-1 is allowed to inherit the activator in a case that the tag discovery timer is not expired and/or the counter has not reached to the maximum value Z.

In some example embodiments, after inheriting the activator role, the UE 120-1 may select at least one reader from a plurality of candidate devices 120-2 to 120-N. In the example of FIG. 1, the UE 120-2 and UE 120-N are selected to be readers of the tag discovery. In an analogous manner, the UE 120-1 may transmit the activation signal. In addition, the UE 120-1 may transmit the information related to the device detection session to the UE 120-2 and UE 120-N. As shown in FIG. 1, the tags 130-1, 130-2 and 130-M are activated by the activation signals from UE 120-1, and thus corresponding response signals are generated and transmitted. Accordingly, the readers 120-2 and 120-N may detect and measure the response signals, then report the tag measurements to the activator, i.e., UE 120-1. In this case, the tag measurements may be forwarded via previous activator(s) to the device that initiates the tag discovery process for determining the position of the tag 130. In example embodiments of the disclosure, a previous activator/reader is referred to a device which was an activator/reader of a tag discovery session or a device detection session and now is not an activator/reader of the tag discovery session or the device detection session. It should be understood that the reference to positioning is made for illustrative purposes only, and this does not preclude initiation of the tag discovery process for other purposes or applications, such as, reading the contents stored by the tag and so on.

It should be understood that the number of devices, passive tags and their connections shown in FIG. 1 are only for the purpose of illustration without suggesting any limitation. The communication network 100 may include any suitable number of devices configured to implementing example embodiments of the present disclosure. Although not shown, it would be appreciated that one or more additional devices, radios or tags may be located in the communication network 100.

For the purpose of illustration, in the example of FIG. 1, the device initiates the tag discovery process is shown as a gNB, and other network elements are shown as UEs.

However, in some other embodiments, the device initiates the tag discovery process may be a terminal device (e.g., UE), and other network elements may be either a terminal device or a network device (e.g., gNB, TRP, etc.). In other words, in the following, operations described in connection with a terminal device may be implemented at a network device or other device, and operations described in connection with a network device may be implemented at a terminal device or other device.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Work Principle and Example Signaling for Communication

Figure 2:
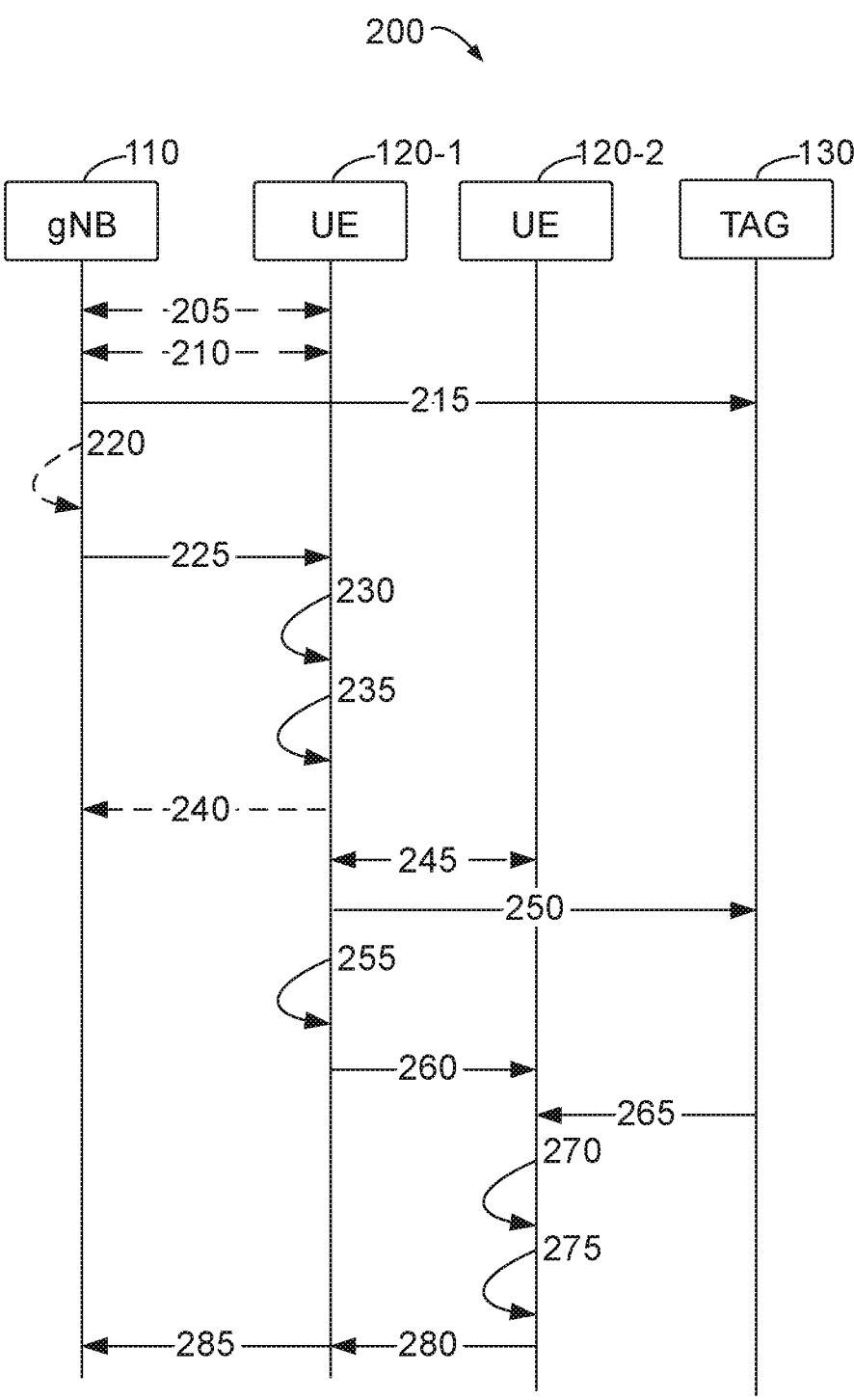
FIG. 2 illustrates a signaling chart for communication according to some example embodiments of the present disclosure.

Reference is now made to FIG. 2, which illustrates a signaling chart 200 for communication according to some example embodiments of the present disclosure. As shown in FIG. 2, the signaling chart 200 involves the gNB 110, the UE 120, and the tags 130. For the purpose of discussion, reference is made to FIG. 1 to describe the signaling flow 200.

The tag discovery process 200 may be implemented between the gNB 110, the UE 120, and the tags 130. The activator-reader pairing may be established 205 between the gNB 110 and UE 120-1.

In some example embodiments, the inheritance scheme may be established 210 between the gNB 110 and UE 120-1.

To this end, the gNB 110 may transmit a first message, e.g., an IE set of physical downlink shared channel (PDSCH), which contains at least:

parameters for the tag discovery process, e.g., a maximum duration D which may correspond to the tag discovery timer and after which the tag discovery process should be terminated, and a maximum number Z of UE 120 to which the activator role can be handed over to before the tag discovery process is terminated;

a rule for terminating the tag discovery process, that is, when at least one of the value D or Z has been reached;

a rule for inheriting the activator role by the reader. For example, the reader may attempt to detect the tag 130 for X seconds from the moment when the first message was received or from the moment the activation signal is detected by the reader, where X may be reader-specific or agreed during the pairing process;

a configuration of the activation signal, including but not limited to, the signal code, waveform, bandwidth, etc. This may enable the reader to i) regenerate the signal and subtract it from its received signal, when the reader attempts to detect the tag 130, thus reducing the activator-to-tag interference, and ii) to take over the activator role and transmit the activation signal if the tag detection fails.

time-frequency resources over which the reader reports back tag measurements to the activator. The SL resources may be pre-agreed, e.g., a set of physical resource blocks (PRBs) reserved for such purpose, or negotiated when the read has collected the tag measurements, where the negotiation may be triggered by the reader.

It should be understood that the IE set of PDSCH is given only for illustrative purposes, without limitation to the present disclosure. In a case where the tag discovery process is performed among UEs, the first message may be an IE set of physical sidelink shared channel (PSSCH), and the time frequency resources may be SL resources.

In some example embodiments, at least part of the first message may be transmitted in a broadcast or multicast manner. In this way, at least part of the first message is common to all the readers. Additionally, or alternatively, the rest of the first message may be unique to each reader, for example, the configuration of the activation signal, the time-frequency resources, and so on, and thus transmitted in a unicast manner.

The gNB 110 may transmit 215 activation signals. For example, the activation signals may be transmitted per tag or per group of tags. Additionally, the gNB 110 may start 220 the tag discovery timer dt=0 and initialize the count h=0. In some example embodiments, the gNB 110 may start the timer at the same time the activation signals are transmitted.

The gNB 110 then transmits 225 information related to the tag discovery process. The information related to the tag discovery process may include the value of the timer dt and/or the value of the counter h. In this way, once the tag discovery process is started, parameters for monitoring the tag discovery process are initialized and tracked by all the network elements involved in the tag discovery process.

Accordingly, the UE 120-1 acting as the reader monitors 230 a response signal from the tag 130 during the tag discovery process. As previously mentioned, the tag 130 is operable to be activated by the activation signal.

The UE 120-1 then causes a change in the tag discovery process based on the monitoring. In the context of the present disclosure, the change in the tag discovery process may include, but not limited to a change of an activator in the tag discovery process, a change of a reader in the tag discovery process, or terminating of the tag discovery process. In some example embodiments, if the response signal is detected at 230, the UE 120-1 may measure the response signal. The UE 120-1 may then transmit the tag measurements to the gNB 110 for positioning the tag.

If no response signal is detected at 230, the UE 120-1 may determine 235 whether termination criteria of the tag discovery process is met based on the updated information related to the tag discovery process. By way of example, the termination criteria may be met in at least one of the following cases:

the tag discovery timer is expired, i.e., dt≥D, the maximum value of the counter has reached, i.e., h≥Z.

If the termination criteria are met at 235, the UE 120-1 causes to terminate the device detection session based on the monitoring. In some example embodiments, the UE 120-1 may transmit 240 an indication of terminating the tag discovery process. For example, the indication may contain a termination flag=1. It should be understood that, in some embodiments, the termination flag may be forwarded directly or via previous activator(s) to the device that initiates the tag discovery process.

Additionally, or alternatively, in some cases, the UE 120-1 may decide to terminate the tag discovery process even if the termination criteria are not met. For example, if the UE 120-1 needs to serve a higher priority traffic, or a battery of the UE 120-1 is limited, it may ignore the termination criteria and terminate the device detection session.

If the termination criteria are not met at 235, the UE 120-1 may inherit the activator role. The UE 120-1 is now the activator, and may select at least one reader (e.g., UE 120-2) if no pairing has been established. The activator-reader pairing between the UE 120-1 and 120-2 may be performed similarly to the activator-reader pairing between gNB 110 and UE 120-1.

In some example embodiments, the reader may be selected from a plurality of candidate devices based on at least one of:

a past communication over sidelink channel, UL, or DL between the new activator and the candidate devices, for example, the UEs 120-2 to 120-N have discovered each other at an earlier time and established a SL with each other, a past SL positioning session.

Alternatively, the activator-reader pairing between the UE 120-1 and 120-2 may be pre-agreed. In this case, the UE 120-1 may inform the UE 120-2 that the pre-agreement comes into force. An acknowledgment from UE 120-2 may not be necessary for the process 200.

In this case, the activator-reader pairing is established 245 between UE 120-1 and UE 120-2. Similarly, the UE 120-1 may transmit a second message to the UE 120-2, and the second message may contain, for example, parameters for the tag discovery process, e.g., a maximum duration D, a maximum number Z of the counter, a rule for terminating the tag discovery process, a rule for inheriting the activator role by the reader, a configuration of the activation signal, SL resources, and so on.

In an alternative embodiment, the gNB 110 may have knowledge of the pre-agreed pairing between the UE 120-1 and 120-2. In this case, instead of the second message from the UE 120-1, the gNB 110 may transmit a third message to the UE 120-2, and the content of the third message may be the same as the content of the second message.

Additionally, in the example embodiments, the UE 120-1 may update the information related to the tag discovery process, for example, the parameters h, dt, etc. In particular, the value of the counter h may be incremented by one, in a case that the tag detection by the reader fails, and the activator role is handed over implicitly to the reader. The value of the timer may be updated throughout the tag discovery process, in at least one of the following cases: i) a new activation signal is transmitted, ii) the tag detection is failed and thus the activator role is handed over, iii) the tag 130 is detected and the discovery process is successful.

The UE 120-1 acting as the activator transmits 250 the activation signals. The UE 120-1 updates 255 the information related to the tag discovery process, and then transmit 260 the updated information to the UE 120-2.

As the tag 130 is activated by the activation signal, the tag 130 transmits 265 response signal to the UE 120-2. The UE 120-2 updates 270 the information related to the tag discovery process.

Upon hearing the response signal, the UE 120-2 measures 275 the response signal. In this case, the tag detection is successful, and thus the UE 120-2 transmits 280 tag measurements to the UE 120-1.

Accordingly, the UE 120-1 may receive the tag measurements of all tags 130. As shown in the example of FIG. 1, the UE 120-1 may collect the measurements of tag 130-1 from UE 120-2, measurements of tag 130-2 and 130-M from UE 120-N, and the like. The UE 120-1 may then forward 285 the tag measurements to a previous activator, i.e., to the gNB 110. Since the gNB 110 is the network element that initiated the tag discovery process, the gNB 110 may then determine the position of the tag 130 based on the tag measurements. In this way, the positioning accuracy and efficiency can be improved.

In an alternative embodiment, there may be at least one intervening network element between the UE 120-1 and the gNB 110, wherein the at least one intervening network element is at least one previous activator. In this case, the UE 120-1 may disregard the at least one intervening network element, and forward the measurements directly to the gNB 110.

Otherwise, if no response signal is heard, and the tag detection is failed, for example, due to blockage between UE 120-1 and the tag 130, the activator role may be returned to gNB 110 and a new reader may be selected by the gNB 110.

Additionally, or alternatively, in the case that the tag detection is failed at UE 120-1 in 230, the UE 120-1 may trigger the gNB 110 to activate the inheritance scheme, for example, via an activation message. Upon reception of the activation message, gNB 110 may pass the activation role to another UE selected from a set of candidate activators. In this case, the UE 120-1 may still act as the reader. The set of candidate activators may be predetermined. This may be useful in case of tag detection failure due to the activator moving away (e.g., if a UE is the activator) or being blocked from the tag 130, or the tag 130 moving away from the activator and/or the reader.

Additionally, or alternatively, in the case that the tag detection is failed at UE 120-1 in 230, the UE 120-1 may pass the reader role to another UE selected from a set of candidate readers. In this case, the gNB 110 may still act as the activator. The set of candidate readers may be shared in advance with either gNB 110 or the UE 120-1 which depends on which network element is responsible for transferring the role. This may be useful in case of tag detection failure due to the tag 130 moving away from the activator and/or the reader, or the reader moving away or being blocked from the tag 130.

It should be understood that some of the steps in process 200 are optional or can be omitted, and the order of the steps is given for an illustrative purpose. For example, the step 215 may be performed in parallel to steps 220, or step 250 may be performed before or in parallel to steps 255. Thus, the embodiments of the present disclosure are not limited in this regard.

According to the example embodiments of the present disclosure, the tag detection session is improved in terms of power consumption and discovery efficiency. The activator and/or reader role can be changed or inherited, and thus preventing from unnecessary transmitting or listening operations.

Example Methods

FIG. 3 illustrates a flowchart of a method 300 implemented at a network element according to some example embodiments of the present disclosure. For example, the network element may include a network device (e.g., gNB, RSU, etc.), a terminal device (e.g., UE, etc.), and so on. For the purpose of discussion, the method 300 will be described from the perspective of the UE 120-1 in FIG. 1.

At block 310, the UE 120-1 as a reader of a device detection session monitors a response signal from a device during the device detection session. The device is operable to be activated by an activation signal transmitted from a first device of the device detection session. In the example shown in FIG. 1, the first device may be the gNB 110 and the device may be the tag 130.

At block 320, the UE 120-1 causes a change in the device detection session based on the monitoring. In particular, the change in the tag discovery process may include a change of an activator in the tag discovery process, a change of a reader in the tag discovery process, terminating of the tag discovery process, and so on.

In some example embodiments, the change may be based on a value of a timer and/or a value of a counter associated with the device detection session. Additionally, in these embodiments, the method 300 may further comprise: receiving the value of the timer and/or the value of the counter from the first device.

In some example embodiments, the timer may indicate a duration of the device detection session, and the counter may count a number of at least one change related to an activator or a reader of the device detection session.

In some example embodiments, the method 300 may further comprise: updating the value of the timer and/or the value of the counter based on the monitoring; and transmitting the updated value of the timer and/or the updated value of the counter to a second device as a reader of the device detection session. In the example shown in FIG. 1, the second device may be the UE 120-2.

In some example embodiments, the method 300 may further comprise: selecting, based on the monitoring, a third device for the device detection session; and activating the third device as an activator of the device detection session.

In some example embodiments, the method 300 may further comprise: transmitting, to the first device, a first indication of the change, wherein a fourth device is to be selected as an activator of the device detection session by the first device based on the first indication.

In some example embodiments, the method 300 may further comprise: selecting, based on the monitoring, a fifth device for the device detection session; and activating the fifth device as the reader of the device detection session. In the example shown in FIG. 1, the fifth device may be the UE 120-2.

In some example embodiments, the method 300 may further comprise: transmitting, to the first device, a second indication of the change, wherein a sixth device is to be selected as a reader of the device detection session by the first device based on the second indication.

In some example embodiments, the method 300 may further comprise: transmitting, to the first device, a second indication of the change, wherein a sixth device is to be selected as a reader of the device detection session by the first device based on the second indication.

In some example embodiments, the method 300 may further comprise: causing to terminate the device detection session based on the monitoring. For example, in a case where the timer has expired and/or the counter has reached a maximum value, the UE 120-1 may cause to terminate the device detection session.

By way of example, the UE 120-1 may terminate the device detection session. Additionally, or alternatively, in another example, the UE 120-1 may transmit, to the first device, a third indication of the change, wherein the device detection session is to be terminated by the first device based on the third indication.

In some example embodiments, the network element may comprise one of a first terminal device or a first network device, and/or the first device may comprise one of a second terminal device or a second network device.

FIG. 4 illustrates a flowchart of an example method 400 implemented at a network element in accordance with some example embodiments of the present disclosure. For example, the network element may include a network device (e.g., gNB, RSU, etc.), a terminal device (e.g., UE, etc.), and so on. For the purpose of discussion, the method 400 will be described from the perspective of the gNB 110 in FIG. 1.

At 410, the gNB 110 as an activator of a device detection session transmits an activation signal, wherein a device is operable to be activated by the activation signal. For example, the device may be a tag, passive IoT device, and so on.

At 420, the gNB 110 transmits, to a first device of the device detection session, information related to the device detection session, wherein a change in the device detection session is to be caused by the first device based on the information. In the example shown in FIG. 1, the first device may be the UE 120-1.

In particular, the change in the tag discovery process may include a change of an activator in the tag discovery process, a change of a reader in the tag discovery process, terminating of the tag discovery process, and so on.

In some example embodiments, the information may comprise a value of a timer and/or a value of a counter associated with the device detection session.

In some example embodiments, the method 400 may further comprise: receiving, from the first device, an indication of a change in the device detection session, wherein the change is based on the value of the timer and/or the value of the counter.

In some example embodiments, the timer may indicate a duration of the device detection session, and the counter may count a number of at least one change related to an activator or a reader.

In some example embodiments, the method 400 may further comprise: selecting, based on the indication, a second device for the device detection session; and activating the second device as an activator of the device detection session.

In some example embodiments, the method 400 may further comprise: selecting, based on the indication, a third device for the device detection session; and activating the third device as a reader of the device detection session.

In some example embodiments, the method 400 may further comprise: terminating the device detection session based on the indication.

In some example embodiments, the method 400 may further comprise: receiving, from the first device, a report of device measurements; and transmitting the report to a fourth device in the device detection session. For example, the fourth device may be a previous activator or a previous reader in the device detection session.

In some example embodiments, the first device comprises one of a first terminal device or a first network device, and/or the apparatus comprises one of a second terminal device or a second network device.

Example Apparatus, Device and Medium

In some example embodiments, an apparatus capable of performing any of the method 300 (for example, the UE 120-1 in FIG. 1) may comprise means for performing the respective operations of the method 300. The means may be implemented in any suitable form. For example, the means may be implemented in a circuitry or software module. The first apparatus may be implemented as or included in the UE 120-1 in FIG. 1.

In some example embodiments, the apparatus comprises: means for monitoring, at the apparatus and as a reader of a device detection session, a response signal from a device during the device detection session, wherein the device is operable to be activated by an activation signal transmitted from a first device of the device detection session; and means for causing a change in the device detection session based on the monitoring.

In some example embodiments, the change is based on a value of a timer and/or a value of a counter associated with the device detection session, and the apparatus further comprises: means for receiving the value of the timer and/or the value of the counter from the first device.

In some example embodiments, the timer may indicate a duration of the device detection session and the counter counts a number of at least on change related to an activator or a reader of the device detection session.

In some example embodiments, the apparatus further comprises: means for updating the value of the timer and/or the value of the counter based on the monitoring; and means for transmitting the updated value of the timer and/or the updated value of the counter to a second device as a reader of the device detection session.

In some example embodiments, the apparatus further comprises: means for selecting, based on the monitoring, a third device for the device detection session; and means for activating the third device as the activator of the device detection session.

In some example embodiments, the apparatus further comprises: means for transmitting, to the first device, a first indication of the change, wherein a fourth device is to be selected as an activator of the device detection session by the first device based on the first indication.

In some example embodiments, the apparatus further comprises: means for selecting, based on the monitoring, a fifth device for the device detection session; and means for activating the fifth device as the reader of the device detection session.

In some example embodiments, the apparatus further comprises: means for transmitting, to the first device, a second indication of the change, wherein a sixth device is to be selected as a reader of the device detection session by the first device based on the second indication In some example embodiments, the apparatus further comprises: means for causing to terminate the device detection session based on the monitoring.

In some example embodiments, the apparatus further comprises: means for terminating the device detection session.

In some example embodiments, the apparatus further comprises: means for transmitting, to the first device, a third indication of the change, wherein the device detection session is to be terminated by the first device based on the third indication In some example embodiments, the first device comprises one of a first terminal device or a first network device, and/or the apparatus comprises one of a second terminal device or a second network device.

In some example embodiments, an apparatus capable of performing any of the method 400 (for example, the gNB 110 in FIG. 1) may comprise means for performing the respective operations of the method 400. The means may be implemented in any suitable form. For example, the means may be implemented in a circuitry or software module. The second apparatus may be implemented as or included in the gNB 110 in FIG. 1.

In some example embodiments, the apparatus comprises: means for transmitting, at the apparatus and as an activator of a device detection session, an activation signal, wherein a device is operable to be activated by the activation signal; and means for transmitting, to a first device of the device detection session, information related to the device detection session, wherein a change in the device detection session is to be caused by the first device based on the information.

In some example embodiments, the information comprises a value of a timer and/or a value of a counter associated with the device detection session.

In some example embodiments, the apparatus further comprises: means for receiving, from the first device, an indication of a change in the device detection session, wherein the change is based on the value of the timer and/or the value of the counter.

In some example embodiments, the timer may indicate a duration of the device detection session and the counter counts a number of at least one change related to an activator or a reader.

In some example embodiments, the apparatus further comprises: means for selecting, based on the indication, a second device for the device detection session; and means for activating the second device as an activator of the device detection session.

In some example embodiments, the apparatus further comprises: means for selecting, based on the indication, a third device for the device detection session; and means for activating the third device as a reader of the device detection session.

In some example embodiments, the apparatus further comprises: means for terminating the device detection session based on the indication.

In some example embodiments, the apparatus further comprises: means for receiving, from the first device, a report of device measurements; and means for transmitting the report to a fourth device in the device detection session, wherein the fourth device was an activator and/or a reader of the device detection session.

In some example embodiments, the first device comprises one of a first terminal device or a first network device, and/or the apparatus comprises one of a second terminal device or a second network device.

Figure 5:
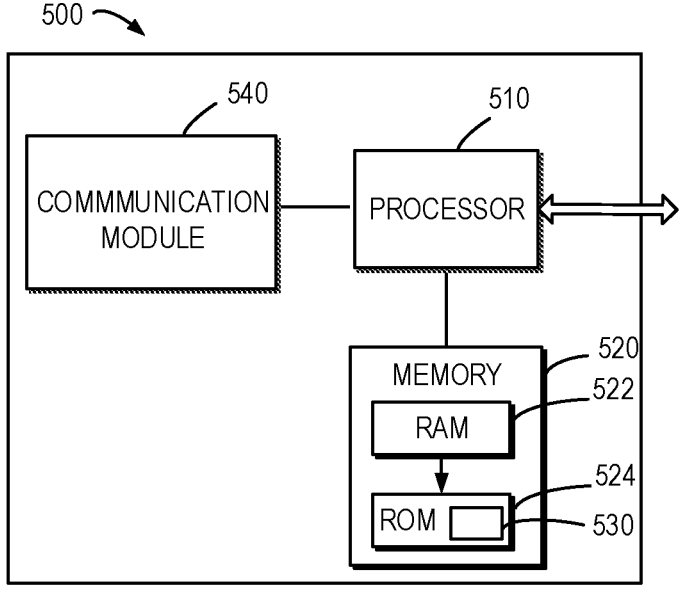
FIG. 5 illustrates a simplified block diagram of a device that is suitable for implementing example embodiments of the present disclosure.

FIG. 5 is a simplified block diagram of a device 500 that is suitable for implementing example embodiments of the present disclosure. The device 500 may be provided to implement an electronic device, for example, the gNB 110, or the UE 120 as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has one or more communication interfaces to facilitate communication with one or more other modules or devices. The communication interfaces may represent any interface that is necessary for communication with other network elements.

In some example embodiments, the communication module 540 may include at least one antenna.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The instructions of the program 530 may include instructions for performing operations/acts of some example embodiments of the present disclosure. The program 530 may be stored in the memory, e.g., the ROM 524. The processor 510 may perform any suitable actions and processing by loading the program 530 into the RAM 522.

The example embodiments of the present disclosure may be implemented by means of the program 530 so that the device 500 may perform any process of the disclosure as discussed with reference to FIG. 2 to FIG. 4. The example embodiments of the present disclosure may also be implemented by hardware or by a combination of software and hardware.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 6:
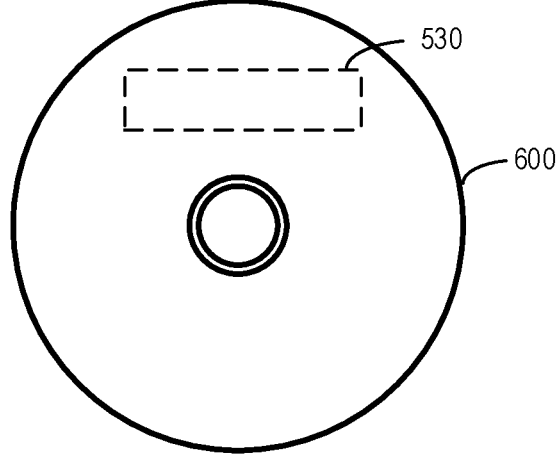
FIG. 6 illustrates a block diagram of an example computer readable medium in accordance with some example embodiments of the present disclosure.

FIG. 6 shows an example of the computer readable medium 600 which may be in form of CD, DVD or other optical storage disk. The computer readable medium 600 has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provides at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:
at least one processor; and
at least one memory storing instructions that, when executed by the at least one processor, cause the apparatus at least to perform:
monitoring, at the apparatus acting as a reader of a device discovery session in a mobile communications network, a radio response signal transmitted from a device in the mobile communications network during the device discovery session, wherein the device is operable to be activated by an activation signal transmitted from a first device acting as an activator of the device discovery session in the mobile communications network; and
causing a change in the device discovery session in the mobile communications network based on the monitoring, wherein, the change that is caused based on the monitoring, comprises changing the reader and/or the activator of the device discovery session in the mobile communication network.

2. The apparatus of claim 1, wherein the change is based on a value of a timer and/or a value of a counter associated with the device discovery session in the mobile communications network, and
wherein the apparatus is further caused to perform:
receiving the value of the timer and/or the value of the counter from the first device.

3. The apparatus of claim 2, wherein the timer indicates a duration of the device discovery session in the mobile communications network and the counter counts a number of at least one change related to an activator or a reader of the device discovery session in the mobile communications network.

4. The apparatus of claim 2, wherein the apparatus is further caused to perform:
updating the value of the timer and/or the value of the counter based on the monitoring; and
transmitting the updated value of the timer and/or the updated value of the counter to a second device as a reader of the device discovery session in the mobile communications network.

5. The apparatus of claim 1, wherein the apparatus is further caused to perform:
selecting, based on the monitoring, a third device for the device discovery session in the mobile communications network; and
activating the third device as an activator of the device discovery session in the mobile communications network.

6. The apparatus of claim 1, wherein the apparatus is further caused to perform:
transmitting, to the first device, a first indication of the change, wherein a fourth device is to be selected as an activator of the device discovery session in the mobile communications network by the first device based on the first indication.

7. The apparatus of claim 1, wherein the apparatus is further caused to perform:
selecting, based on the monitoring, a fifth device for the device discovery session in the mobile communications network; and
activating the fifth device as a reader of the device discovery session in the mobile communications network.

8. The apparatus of claim 1, wherein the apparatus is further caused to perform:
transmitting, to the first device, a second indication of the change,
wherein a sixth device is to be selected as a reader of the device discovery session in the mobile communications network by the first device based on the second indication.

9. The apparatus of claim 1, wherein the apparatus is further caused to perform:
causing to terminate the device discovery session in the mobile communications network based on the monitoring.

10. The apparatus of claim 9, wherein the apparatus is further caused to perform:
transmitting, to the first device, a third indication of the change,
wherein the device discovery session in the mobile communications network is to be terminated by the first device based on the third indication.

11. The apparatus of claim 1, wherein the first device comprises one of a first terminal device or a first network device, and/or the apparatus comprises one of a second terminal device or a second network device.

12. An apparatus, comprising:
at least one processor; and
at least one memory storing instructions that, when executed by the at least one processor, cause the apparatus at least to perform:
transmitting, at the apparatus acting as an activator of a device discovery session in a mobile communications network, an activation signal, wherein a device in the mobile communications network is operable to be activated by the activation signal; and
transmitting, to a first device acting as an activator of the device discovery session in the mobile communications network, information related to the device discovery session in the mobile communications network, wherein a change in the device discovery session in the mobile communications network is to be caused by the first device based on the information, wherein, the change that is caused based on the transmitting, comprises changing a reader and/or the activator of the device discovery session in the mobile communication network.

13. The apparatus of claim 12, wherein the information comprises a value of a timer and/or a value of a counter associated with the device discovery session in the mobile communications network.

14. The apparatus of claim 13, wherein the timer indicates a duration of the device discovery session in the mobile communications network and the counter counts a number of at least one change related to the activator or the reader of the device discovery session in the mobile communications network.

15. The apparatus of claim 13, wherein the apparatus is further caused to perform:
receiving, from the first device, an indication of a change in the device discovery session in the mobile communications network, wherein the change is based on the value of the timer and/or the value of the counter.

16. The apparatus of claim 15, wherein the apparatus is further caused to perform:
selecting, based on the indication, a second device for the device discovery session in the mobile communications network; and
activating the second device as an activator of the device discovery session in the mobile communications network.

17. The apparatus of claim 15, wherein the apparatus is further caused to perform:
selecting, based on the indication, a third device for the device discovery session in the mobile communications network; and

activating the third device as the reader of the device discovery session in the mobile communications network.

18. The apparatus of claim 12, wherein the apparatus is further caused to perform:
receiving, from the first device, a report of device measurements; and
transmitting the report to a fourth device in the device discovery session in the mobile communications network, wherein the fourth device was the activator and/or the reader of the device discovery session in the mobile communications network.

19. The apparatus of claim 12, wherein the first device comprises one of a first terminal device or a first network device, and/or the apparatus comprises one of a second terminal device or a second network device.

20. A method comprising:
monitoring, by an apparatus acting as a reader of a device discovery session in a mobile communications network, a radio response signal transmitted from a device in the mobile communications network during the device discovery session in the mobile communications network, wherein the device is operable to be activated by an activation signal transmitted from a first device acting as an activator of the device discovery session in the mobile communications network; and
causing, by the apparatus, a change in the device discovery session in the mobile communications network based on the monitoring, wherein, the change that is caused based on the monitoring, comprises changing the reader and/or the activator of the device discovery session in the mobile communication network.

* * * * *